United States Patent [19]
Nagano

[11] Patent Number: 4,591,026
[45] Date of Patent: May 27, 1986

[54] CALIPER BRAKE HAVING POSITION MAINTENANCE MEANS

[75] Inventor: Masashi Nagano, Izumi, Japan

[73] Assignee: Shimano Industrial Company Limited, Osaka, Japan

[21] Appl. No.: 556,997

[22] Filed: Dec. 1, 1983

[30] Foreign Application Priority Data

Dec. 8, 1982 [JP] Japan .................. 57-186481[U]

[51] Int. Cl.$^4$ .............................................. B62L 1/12
[52] U.S. Cl. ................. 188/2 D; 188/24.19; 188/24.22
[58] Field of Search ............ 188/2 D, 24.11, 24.12, 188/24.13, 24.14, 24.15, 24.19, 24.22

[56] References Cited

U.S. PATENT DOCUMENTS 3,941,215 3/1976 Schoch ..................... 188/24.19

FOREIGN PATENT DOCUMENTS

| 8812 | 3/1980 | European Pat. Off. | 188/24.12 |
| 553214 | 5/1923 | France | 188/24.19 |
| 1084288 | 1/1955 | France . | |
| 56-138231 | 10/1981 | Japan . | |
| 239473 | 1/1946 | Switzerland | 188/24.12 |
| 658504 | 10/1951 | United Kingdom . | |

Primary Examiner—Bruce H. Stoner, Jr.
Assistant Examiner—Richard R. Diefendorf
Attorney, Agent, or Firm—Stevens, Davis, Miller & Mosher

[57] ABSTRACT

A caliper brake includes a pair of brake arms, each having a brake shoe wherein the brake arms are operated in swinging motion by a control wire which thereby exerts braking action. A receiving member for the wire, or an outer sheath guiding the wire, is supported to a support member through a shaft member in relation of being movable in the same direction as the movement of the operated control wire. An operating member is supported rotatably to the shaft member, and a cam face having a plurality of recesses is formed at one of the operating member and the support member while an engaging portion engageable with at least one of the recesses is provided at the other.

3 Claims, 7 Drawing Figures

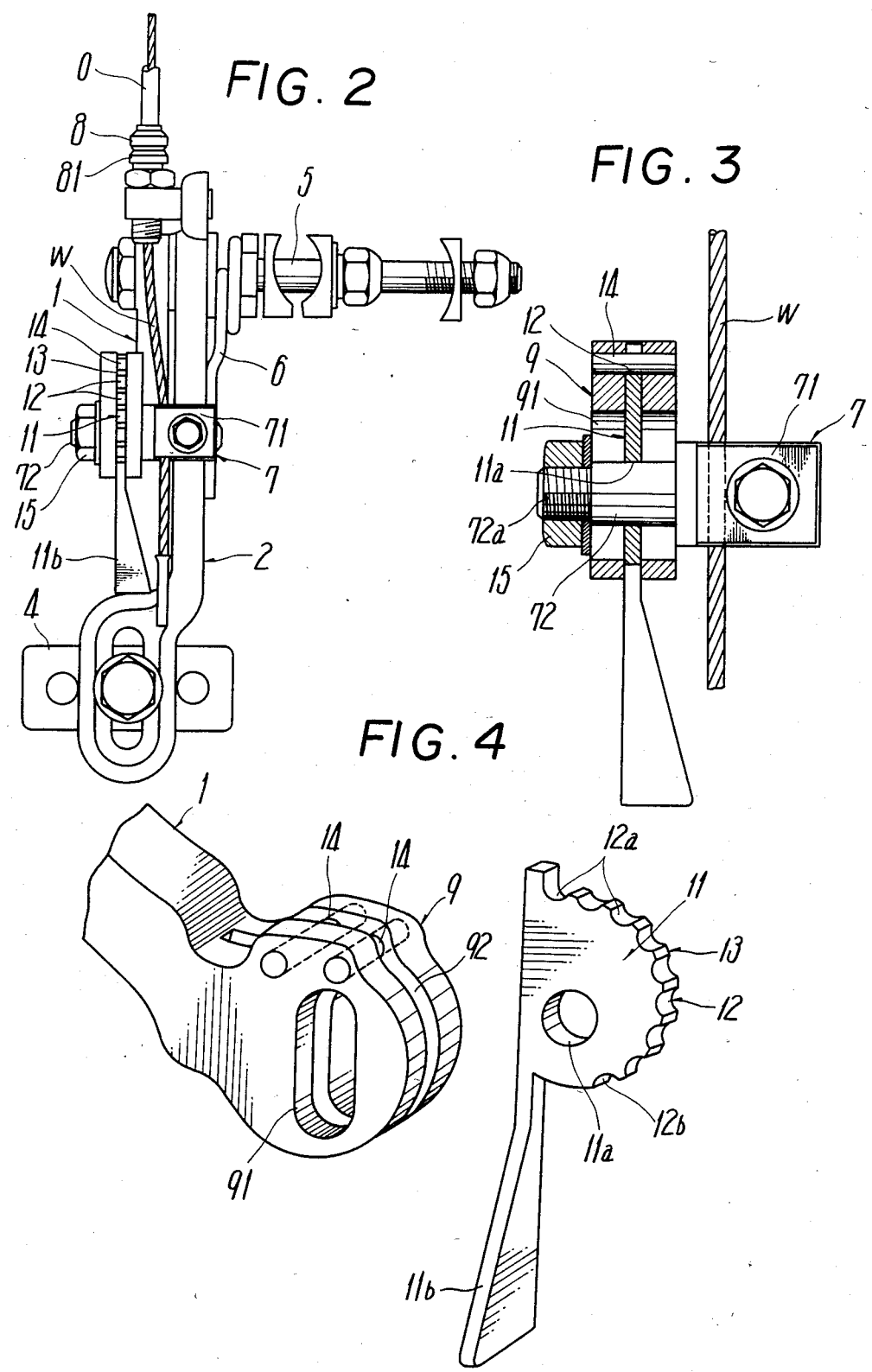

CALIPER BRAKE HAVING POSITION MAINTENANCE MEANS

FIELD OF THE INVENTION

This invention relates to a caliper brake, and more particularly, to a caliper brake for a bicycle, which is mounted to a front fork or a back fork thereof.

BACKGROUND OF THE INVENTION

Generally, bicycle caliper brakes include a pair of brake arms having brake shoes disposed at both sides of a wheel rim, with the brake arms swinging by operation of a control wire, and the brake shoes being brought into press-contact with both side surfaces of wheel rim, thereby exerting the braking action.

Such caliper brake is disposed in the vicinity of the outer periphery of the wheel tire and each brake shoe is spaced at a minute interval from the wheel rim, so that when the wheel is axially deflected by, for example, a collision of the bicycle or a use of the bicycle for motorcross racing on rugged roads, the brake shoes, not during desired braking action, come into contact with the wheel rim, thereby creating a problem of increasing a rotational resistance of the wheel.

Japanese Utility Model Application No. Sho 56-138,231, discloses a caliper brake wherein the space between the brake shoes is adjustable by means of quick operation. Such caliper brake is so constructed that a holder for a control wire or an outer sheath therefor is supported to a stud movable in the same direction as the movement of the control wire when operated. The stud carries an operating member having a snail-like-shaped cam face spirally extending, and the cam face abuts against a support member supporting the stud, so that the control member is turned to change the position of the cam face in contact with the support member, thereby adjusting the interval between the brake shoes. Hence, in a case where the caliper brake is used especially in a motorcoross bicycle whose body is subjected to a greater impact, the problem is created in that the control member may unexpectedly rotate due to the external force to thereby make it impossible to maintain the carefully adjusted interval between the brake shoes.

The above problem can be solved in such a manner that the cam face of the control member is adapted to contact with the support member at both sides of the path of movement of the control wire, thereby preventing the control member from unexpectedly rotating by the impact on the bicycle. However, in a case where the operating member is hit by an external object during the motocrossing, its unexpected rotation cannot be prevented, and also, the positional relation between the support member and the operating member is restricted to affect a degree of freedom in the design to that extent.

SUMMARY OF THE INVENTION

An object of the invention is to improve a caliper brake, in which a control member only is turned to quickly adjust an interval between the brake shoes, and even when the bicycle as a whole is subjected to a sizable impact or an external force, the adjusted interval can be maintained. At the same time, the operating member and support member are not restricted in the positional relation therebetween, to thereby enable the degree of freedom in design to increase.

This invention is characterized in that the control member, even when adapted to come into contact with the support member away from the path of movement of the control wire, can ensure the maintenance of the position of the brake shoes as adjusted by the operating member.

In detail, this invention is directed to an improvement in a caliper brake provided with a pair of brake arms, a spring means for biasing the brake arms in the direction of moving them away from each other, and an operating means comprising a control wire which allows the brake arms to swing against the spring means and an outer sheath for guiding the control wire. This invention is characterized by providing a receiving portion for retaining the control means, a receiving member having a shaft member extending to one side relative to the receiving portion, a support member which supports the shaft member in relation of being displaceable in the same direction as the movement of the operated control wire, an operating member supported rotatably to the shaft member, and a maintaining means interposed between the support member and the operating member. The maintaining means includes a cam face having a plurality of recesses recessed in the direction of biasing action of the spring means and an engaging portion opposite to the cam surface, engageble with at least one of the recesses. The maintaining means sets and maintains the position of the receiving member with respect to the support member.

Accordingly, this invention can maintain the adjusted position between the brake shoes by engagement of the engageable portion with one recess of the maintaining means, so that the engageable portion engages with another recess by overcoming a biasing force of the spring means, thereby enabling the adjusted position to be reliably maintained by the operating member without creating any unexpected disorder.

BRIEF DESCRIPTION OF THE DRAWINGS

These and other objects of the invention will be seen by reference to the following description, taken in connection with the accompanying drawings, in which:

FIG. 2 is a side view of the FIG. 1 embodiment,

FIG. 3 is a sectional view taken on the line III—III in FIG. 1,

FIG. 4 is a perspective exploded view of a principal portion of the FIG. 1 embodiment.

DETAILED DESCRIPTION OF THE INVENTION

Figure 1:
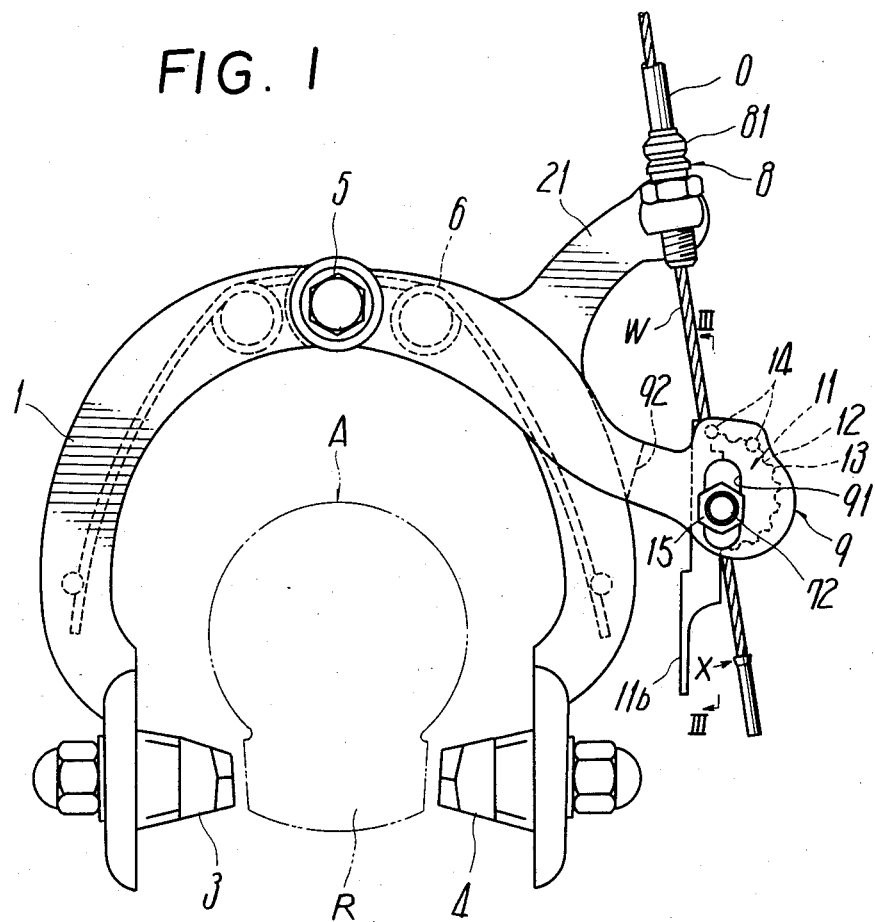
FIG. 1 is a front view of an embodiment of a caliper brake of the invention.

FIGS. 1 through 4 show a side-pull system caliper brake for a bicycle, which comprises a C-like-shaped brake arm 1 having a brake shoe 3, a Y-like-shaped brake arm 2 having a brake shoe 4, a spring means 6 for biasing the brake shoes 3 and 4 to move away from each other, and an operating means comprising a control wire W which swings the brake arms 1 and 2 against the spring means 6 and an outer sheath O for guiding the control wire W.

The brake arms 1 and 2 are supported swingably to a pivot bolt 5 mounted to, for example, a front fork or a back fork at the bicycle. A first receiving member 7 having a receiving portion 71 for retaining one end of wire W is provided at a free end of C-like-shaped brake arm 1, and a second receiving member 8 having a receiving portion 81 for retaining one end of outer sheath O is provided at a branch 21 of Y-like-shaped brake arm 2, so that the control wire W is pulled to swing both the brake arms 1 and 2 and to bring the brake shoes 3 and 4 into contact with the wheel rim R, thereby exerting the braking action.

The caliper brake of the abovementioned construction is well-known and readily understandable from the conventional one.

This invention is directed to an improvement in the caliper brake constructed as described above. Referring to FIGS. 1 through 4, a support member 9 having an elongate slot 91 extending in the same direction as the movement of control wire W when operated, is provided integrally with the free end of C-like-shaped brake arm 1. First receiving member 7 is provided with a shaft member 72 projecting one-sidedly from the receiving portion 71 and supported movably in the same direction as the movement of operated control wire W through the shaft member 72 inserted into the slot 91. Operating member 11 of plate-like shape has a shaft bore 11a and is supported rotatably around the shaft member 72. A cam face 13 having a plurality of recesses 12 is provided at the outer periphery of operating member 11 along the rotating direction thereof, and the support member 9 is provided with a pin 14 engageable with at least one recess 12, so that the engageable pin 14 engages with the one recess 12 to set the rotary operation position of operating member 11, in other words, the position of first receiving member 7 with respect to the support member 9. In turn, a maintaining means is formed which adjusts an interval between the brake shoes 3 and 4 and maintains the adjusted interval.

The operating member 11, as shown in FIG. 4, is formed of a flat metallic plate and provided at one side with a knob 11b. The cam face 13 at the operating member 11 is formed in a circular arc eccentric with respect to the shaft bore 11a as shown. In addition, each recess 12, at the position where it engages with the engageable pin 14, recesses in the direction reverse to the movement of operated control wire W and is biased to the engaging pin 14 through the biasing force of spring means 6.

The support member 9, as shown in FIGS. 1 through 4, is integral with the brake arm 1 and provided with a groove 92 intersecting the elongate slot 91 so that the operating member 11 is inserted operatively into the groove 92 and supported rotatably to the shaft member 72 inserted into the shaft bore 11a. Also, the shaft member 72 is provided at the outer periphery of one axial end thereof with a screw thread 72a which screws with a nut 15, thereby being mounted to the support member 9 movably along the elongate slot 91. The engageable pin 14 at the support member 9 intersects the groove 92.

In addition, two pins 14 are provided as shown, but one pin 14 on the path of movement of wire W and at the upper stage in FIG. 1 is not indispensable.

In other words, in a case where the wire is pulled to exert the braking action, the operating member 11 is subjected to a moment of rotation acting clockwise in FIG. 1 around the one recess 12 in engagement with the pin 14 apart from the path of movement of wire W, and thus is subjected to a force which would tend to cause it to rotate together with the shaft member 72 around the recess 12, but is restrained from rotation because the shaft member 72 inserted into the elongate slot 91 abuts against the wall thereof. As a result, the engagement of pin 14 with the recess 12 is maintained without shifting. Hence, even with only one engageable pin 14, the engaging position of recess 12 therewith is not shifted by vibrations from the bicycle frame or an external force acting on the knob 11b at the operating member 11. In such case where only one pin 14 is used, it is preferable that the position where the recess 12 engages with the pin 14 is displaced with respect to the direction of pulling the wire W so that the pulling force acting thereon applies a moment of rotation to the operating member 11, and the cam face 13 thereof is formed to become larger gradually in a distance from the center of shaft member 72 in the reverse direction to the direction in which operating member 11 would tend to move by application of the the above-described moment of rotation. Thus, in accordance with the presesent invention, the operating member 11 is more reliably prevented from shifting which would tend to be caused by the pulling force on the wire W.

The caliper brake of the invention constructed as above-mentioned allows the engageable pin 14 to engage with the recess 12a at the higher stage and far apart from the shaft member 72 to thereby keep constant an interval between each brake shoe 3 or 4 and the wheel rim R, thus exerting a normal braking action by a pull of wire W.

In a case where deflection is caused in the wheel because of collision of the bicycle or its running on rugged roads so that the brake shoe 3 or 4 and wheel rim R, undesirably, i.e. not during desired braking action, become smaller in clearance therebetween to lead to contact with each other, the operating member 11 is turned in the direction of the arrow X in FIG. 1 to change the engagement of pin 14 with the recess 12 from the high stage to the low stage which has a smaller distance from the shaft member 72. Hence, the brake arms 1 and 2 are expanded at their ends from each other around a pivot bolt 5 by means of a restoring force of spring means 6, thereby enlarging the interval between each brake shoe 3 or 4 and the wheel rim R to adjust the brake shoe clearance. At this time, the adjusting position by the operating member 11 can desirably be set and desirably maintained by the engagement of recess 12 with the pin 14. Also, even when the bicycle as a whole is subjected to a greater impact, or the knob 11b is subjected to an external force, the operating member 11 can reliably be maintained in the adjusted position thereof.

When the wheel A in FIG. 1 is intended to be exchanged, the operating member 11 is turned in the direction of the arrow X and the recess 12b having the smallest distance from the shaft member 72 is engaged with the pin 14 to make larger the interval between the brake shoes 3 and 4 than a width of wheel A, whereby the wheel A is removed through brake shoes 3 and 4. Upon completing the exchange of wheel A, the operating member 11 is turned in the reverse direction to the arrow X to engage the pin 14 with the recess 12a at the high stage and to allow the brake shoes 3 and 4 to approach the wheel rim R.

Figure 5:
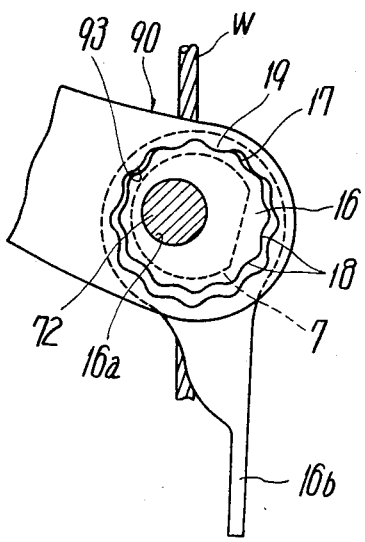
FIG. 5 is a view explanatory of a principal portion of a modified embodiment of the invention.

Alternatively, a support member 90, as shown in FIG. 5, may be provided with a round bore 93 of larger diameter and a cam face 17 provided at an operating member 16 may be made round, so that the operating member 16 may be supported eccentrically with respect to the shaft member 72.

In this case, the maintaining means comprises recesses 18 provided at the outer periphery of cam face 17 and a plurality of engaging portions 19 provided at the inner periphery of round bore 93 and engageable with the recesses 18 respectively. In addition, in FIG. 5, reference numeral 16a designates a shaft bore provided eccentrically at the operating member 16, and 16b designates a knob.

Also, in the aforesaid embodiments, the cam faces 13 and 17 may alternatively be provided at the support member 9 and 90, and the engageable pin 14 and engageable portions 19 at the operating members 11 and 16 respectively.

Figure 6:
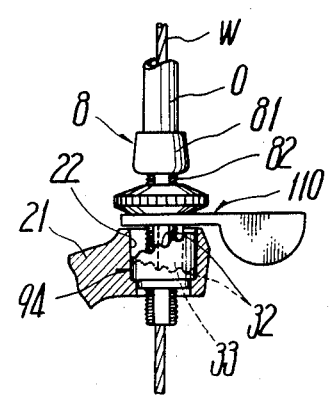
FIG. 6 is a view explanatory of a principal portion of another modified embodiment of the invention.

Furthermore, a second receiving member 8 supporting the outer sheath O, as shown in FIG. 6, may be provided with a shaft member 82, which is supported movably to, for example, a support member at the Y-like-shaped brake arm 2.

Figure 7:
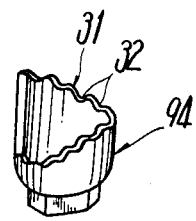
FIG. 7 is a perspective view of a support member only at the FIG. 6 embodiment.

In FIG. 6, a stepped recess 22 is provided at the free end of a branch 21 of Y-like-shaped brake arm 2. A cylindrical support member 94 separate from the branch 21 is insertably supported into the recess 22 in relation of being not-rotatable relative thereto, and the support member 94, as shown in FIG. 7, is provided with a cam face 31 having a plurality of recesses 32. Shaft member 82 at the second receiving member 8 is fitted into the central portion of support member 94, and an operating member 110 is supported rotatably to the shaft member 82. Engaging member 33 is engageable with each recess 32 and projects from the operating member 110.

The aforesaid embodiments of the invention are applied to the side-pull caliper brake, which may be applied to a center-pull caliper brake which pivotally supports a pair of brake arms separately. In this case, the support member is supported to, for example, a fixed gate for holding the brake arms.

As seen from the above, this invention includes a shaft member at the receiving member having the receiving portion for the wire or outer sheath therefor, a support member supported through the shaft member in relation of being movable in the same direction as movement of the operated control wire, an operating member supported rotatably around the shaft member, and a maintaining means which comprises a cam face having a plurality of recesses and an engaging portion engageable with at least one of the recesses, with the maintaining means being located between the operating member and the support member. Hence, the quick operation merely of turning the operating member can adjust step by step the interval between the brake shoes and also reliably maintain the adjusted position of the operating member by the engagement of the engaging portion with the recess, thereby preventing the adjusted position of the operating member from shifting unexpectedly even when the bicycle as a whole is subjected to a large impact or the operating member is subjected to an external force.

The positional relation between the recess and the engaging portion can be set without regard to the path of movement of control wire and is not restricted, thereby improving the degree of freedom in the design.

Although several embodiments have been described, they are merely exemplary of the invention and are not to be construed as limiting, the invention being defined solely by the appended claims.

What is claimed is:

1. A caliper brake comprising a pair of brake arms each having a brake shoe; spring means which biases said brake arms in a direction of moving said brake shoes away from each other; operating means comprising a control wire for swinging said brake arms against a bias of said spring means; an outer sheath for guiding said wire; a receiving member having a receiving portion for retaining said operating means and a shaft member extending to one side with respect to said receiving portion; a support member which supports said shaft member at said receiving member to be displaceable in a same direction as a moving direction of said wire when said wire is operated; an operating member supported rotatably to said shaft member; and maintaining means provided between said support member and said operating member, for setting and maintaining a position of said receiving member with respect to said support member, said maintaining means comprising a cam face having a plurality of recesses and an engaging portion which is opposite to said cam face, said engaging portion engaging with at least one of said recesses, said recesses being adapted to be biased to engage with said engaging portion by said spring means, said at least one of said recesses engaging with said engaging portion of said maintaining means at a position which is displaced with respect to a pulling direction of said control wire such that said opening member is subjected to a moment of rotation by a pulling force acting on said wire.

2. A caliper brake according to claim 1, wherein said engaging portion comprises an engaging pin.

3. A caliper brake comprising a pair of brake arms each having a brake shoe; spring means which biases said brake arms in a direction of moving said brake shoes away from each other; operating means comprising a control wire for swinging said brake arms against a bias of said spring means; an outer sheath for guiding said wire; a receiving member having a receiving portion for retaining said operating means and a shaft member extending to one side with respect to said receiving portion; a support member which supports said shaft member at said receiving member to be displaceable in a same direction as a moving direction of said wire when said wire is operated; an operating member supported rotatably to said shaft member; and maintaining means provided between said support member and said operating member, for setting and maintaining a position of said receiving member with respect to said support member, said maintaining means comprising a cam face having a plurality of recesses and an engaging portion which is opposite to said cam face, said engaging portion engaging with at least one of said recesses, said recesses being adapted to be biased to engage with said engaging portion by said spring means, said cam face being located at an outer surface of said operating member, said engaging portion being disposed on said support member, said operating member having a circular cam face and being supported eccentrically and rotatably to said shaft member, said support member having a round bore in which said cam face is located, and said round bore including said engaging portion at an inner periphery thereof.

* * * * *